(12) United States Patent
Bali et al.

(10) Patent No.: US 9,553,817 B1
(45) Date of Patent: Jan. 24, 2017

(54) DIVERSE TRANSMISSION OF PACKET CONTENT

(75) Inventors: Soshant Bali, San Mateo, CA (US); Kosol Jintaseranee, San Jose, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1269 days.

(21) Appl. No.: 13/182,619

(22) Filed: Jul. 14, 2011

(51) Int. Cl.
H04L 12/807 (2013.01)
H04L 12/70 (2013.01)

(52) U.S. Cl.
CPC ....... H04L 47/27 (2013.01); *H04L 2012/5635* (2013.01)

(58) Field of Classification Search
CPC ... H04L 47/10; H04L 47/27; H04L 2012/5635
See application file for complete search history.

(56) References Cited

U.S. PATENT DOCUMENTS

| | | | |
|---|---|---|---|
| 5,579,307 A * | 11/1996 | Richetta et al. | 370/409 |
| 5,751,968 A | 5/1998 | Cohen | |
| 5,933,834 A | 8/1999 | Aichelen | |
| 5,950,135 A * | 9/1999 | Cullen | H04L 45/00 370/312 |
| 6,003,045 A | 12/1999 | Freitas et al. | |
| 6,029,168 A | 2/2000 | Frey | |
| 6,049,804 A | 4/2000 | Burgess et al. | |
| 6,105,029 A | 8/2000 | Maddalozzo, Jr. et al. | |
| 6,134,246 A | 10/2000 | Cai et al. | |
| 6,212,190 B1 * | 4/2001 | Mulligan | 370/400 |
| 6,470,015 B1 | 10/2002 | Koga et al. | |
| 6,499,039 B1 | 12/2002 | Venkatesh et al. | |
| 6,502,166 B1 | 12/2002 | Cassidy | |
| 6,502,216 B1 | 12/2002 | Takano | |
| 6,691,166 B1 | 2/2004 | Gasior et al. | |
| 6,804,259 B1 * | 10/2004 | Onagawa | 370/476 |
| 7,403,992 B2 | 7/2008 | Tilander et al. | |
| 7,764,965 B2 * | 7/2010 | Bartlett | 455/436 |
| 7,812,854 B1 * | 10/2010 | Delker et al. | 348/14.01 |
| 7,953,820 B2 * | 5/2011 | Stevens et al. | 709/219 |
| 8,204,945 B2 * | 6/2012 | Milliken et al. | 709/206 |
| 8,224,298 B2 * | 7/2012 | Smith et al. | 455/414.1 |

(Continued)

OTHER PUBLICATIONS

U.S. Appl. No. 10/929,305, filed Aug. 30, 2004.
U.S. Appl. No. 11/385,405, filed Mar. 21, 2006.

*Primary Examiner* — Hassan Phillips
*Assistant Examiner* — Prenell Jones (57) ABSTRACT

Embodiments disclosed herein provide systems and methods for dividing packet content for transmission over diverse wireless links. In a particular embodiment, a method provides generating a packet for transmission to a destination and examining the packet to determine if content within the packet qualifies for transmission over diverse wireless links comprising a first wireless link and a second wireless link. The method further provides, if the content qualifies for transmission over the diverse wireless links, generating a first alternate packet that contains a first portion of the content and a second alternate packet that contains a second portion of the content. The method further provides transferring the first alternate packet over the first wireless link for delivery to the destination and transferring the second alternate packet over the second wireless link for delivery to the destination.

19 Claims, 7 Drawing Sheets

(56) References Cited

U.S. PATENT DOCUMENTS

| | | |
|---|---|---|
| 8,380,878 B2* | 2/2013 | Shrum et al. ............... 709/246 |
| 8,412,040 B2* | 4/2013 | Valiveti et al. ............... 398/52 |
| 8,467,293 B2* | 6/2013 | Alicherry et al. ........... 370/235 |
| 8,806,520 B2* | 8/2014 | Sharif-Ahmadi et al. ...... 725/14 |
| 8,848,739 B2* | 9/2014 | Petersen ...................... 370/474 |
| 2002/0019934 A1 | 2/2002 | Ishizaki |
| 2002/0118215 A1 | 8/2002 | Ball et al. |
| 2002/0133491 A1 | 9/2002 | Sim et al. |
| 2002/0138504 A1 | 9/2002 | Yano et al. |
| 2002/0156840 A1 | 10/2002 | Ulrich et al. |
| 2003/0004922 A1 | 1/2003 | Schmidt et al. |
| 2003/0004947 A1 | 1/2003 | Coverston |
| 2003/0046260 A1 | 3/2003 | Satyanarayanan et al. |
| 2003/0093806 A1* | 5/2003 | Dureau et al. ................ 725/107 |
| 2003/0120685 A1 | 6/2003 | Duncombe et al. |
| 2003/0140051 A1 | 7/2003 | Fujiwara et al. |
| 2003/0167439 A1 | 9/2003 | Talagala et al. |
| 2004/0019801 A1* | 1/2004 | Lindholm et al. ............ 713/200 |
| 2004/0076160 A1* | 4/2004 | Phaltankar ................. 370/395.1 |
| 2004/0093513 A1 | 5/2004 | Cantrell et al. |
| 2004/0107314 A1 | 6/2004 | Kim et al. |
| 2004/0139125 A1 | 7/2004 | Strassburg et al. |
| 2004/0143575 A1 | 7/2004 | Cherkasova |
| 2004/0143576 A1 | 7/2004 | Cherkasova |
| 2004/0143595 A1 | 7/2004 | Cherkasova |
| 2004/0143607 A1 | 7/2004 | Beck |
| 2004/0153479 A1 | 8/2004 | Mikesell et al. |
| 2004/0205387 A1 | 10/2004 | Kleiman et al. |
| 2005/0005193 A1 | 1/2005 | Nakagawa et al. |
| 2005/0097270 A1 | 5/2005 | Kleiman et al. |
| 2005/0120078 A1 | 6/2005 | Kazar et al. |
| 2005/0180568 A1* | 8/2005 | Krause ......................... 380/212 |
| 2005/0240725 A1 | 10/2005 | Robinson et al. |
| 2005/0243857 A1* | 11/2005 | Hofstaedter et al. ......... 370/447 |
| 2005/0286522 A1 | 12/2005 | Paddon et al. |
| 2006/0031847 A1 | 2/2006 | Macdonald et al. |
| 2006/0159303 A1* | 7/2006 | Davis et al. .................. 382/100 |
| 2006/0203852 A1* | 9/2006 | Yoshida ........................ 370/503 |
| 2007/0047457 A1 | 3/2007 | Harijono et al. |
| 2007/0078731 A1* | 4/2007 | Hameen-Anttila et al. .... 705/27 |
| 2007/0140240 A1 | 6/2007 | Dally et al. |
| 2007/0192860 A1 | 8/2007 | Hiscock |
| 2007/0271350 A1 | 11/2007 | Kazar et al. |
| 2007/0288715 A1* | 12/2007 | Boswell ............. G11B 20/00086 <br> 711/164 |
| 2008/0062940 A1* | 3/2008 | Othmer et al. ............... 370/338 |
| 2008/0086751 A1* | 4/2008 | Horn et al. ..................... 725/87 |
| 2008/0090513 A1* | 4/2008 | Collins et al. ............... 455/3.01 |
| 2009/0086737 A1* | 4/2009 | Fairhurst et al. ............. 370/394 |
| 2009/0092153 A1* | 4/2009 | Howard et al. ............... 370/474 |
| 2009/0296624 A1* | 12/2009 | Ryu et al. ..................... 370/312 |
| 2009/0320077 A1* | 12/2009 | Gazdzinski ..................... 725/62 |
| 2010/0027837 A1* | 2/2010 | Levy et al. .................... 382/100 |
| 2010/0037311 A1 | 2/2010 | He et al. |
| 2010/0115056 A1* | 5/2010 | Tuli .............................. 709/219 |
| 2010/0174608 A1* | 7/2010 | Harkness et al. .......... 705/14.53 |
| 2010/0250917 A1* | 9/2010 | Marivoet et al. ............. 713/150 |
| 2010/0265954 A1* | 10/2010 | Pullen et al. ................. 370/394 |
| 2011/0016196 A1* | 1/2011 | Martin-Cocher et al. .... 709/219 |
| 2011/0096828 A1* | 4/2011 | Chen et al. ............. 375/240.02 |
| 2011/0125861 A1* | 5/2011 | Evans ................. H04L 67/1072 <br> 709/206 |
| 2011/0173653 A1* | 7/2011 | Arsenault et al. .............. 725/31 |
| 2011/0196971 A1* | 8/2011 | Reguraman et al. ......... 709/228 |
| 2011/0264768 A1* | 10/2011 | Walker et al. ................ 709/218 |
| 2012/0042005 A1* | 2/2012 | Papakostas et al. .......... 709/203 |
| 2012/0054811 A1* | 3/2012 | Spears ......................... 725/106 |
| 2012/0106567 A1* | 5/2012 | Hanes et al. .................. 370/412 |
| 2012/0173635 A1* | 7/2012 | Wormald ............. G06Q 10/107 <br> 709/206 |
| 2012/0182884 A1* | 7/2012 | Pyatkovskiy et al. ........ 370/250 |
| 2012/0281590 A1* | 11/2012 | Szab et al. .................... 370/253 |
| 2012/0315008 A1* | 12/2012 | Dixon et al. .................. 386/230 |
| 2013/0148513 A1* | 6/2013 | Szabo et al. .................. 370/252 |
| 2013/0194930 A1* | 8/2013 | Szabo et al. .................. 370/235 |

* cited by examiner

DIVERSE TRANSMISSION OF PACKET CONTENT

TECHNICAL BACKGROUND

Many modern communication networks are capable of exchanging packet based communications with other communication networks and communication devices. Some of these networks may employ deep packet inspection (DPI) equipment on some or all of the packets that travel through each respective network. DPI equipment allows a network to inspect the payload contents of packets that pass through the network. This packet inspection capability allows a network to gather information about the packets that the network is transporting in order to better manage the network.

While DPI equipment may have beneficial uses, such as for network management, the use of DPI may also raise privacy concerns. For example, DPI equipment may allow a network to obtain information from a user's packet traffic, such as usernames, passwords, and web addresses, which the user would want to keep private. While encrypting packet traffic that is transferred from a communication device may be a way to overcome DPI privacy concerns, the system or device that is receiving that packet traffic must also be equipped with the ability to decrypt the transferred packets. Thus, encrypting data may not always be available to protect private information from capture by DPI equipment.

Overview

Embodiments disclosed herein provide systems and methods for dividing packet content for transmission over diverse wireless links. In a particular embodiment, a method provides generating a packet for transmission to a destination and examining the packet to determine if content within the packet qualifies for transmission over diverse wireless links comprising a first wireless link and a second wireless link. The method further provides, if the content qualifies for transmission over the diverse wireless links, generating a first alternate packet that contains a first portion of the content and a second alternate packet that contains a second portion of the content. The method further provides transferring the first alternate packet over the first wireless link for delivery to the destination and transferring the second alternate packet over the second wireless link for delivery to the destination.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
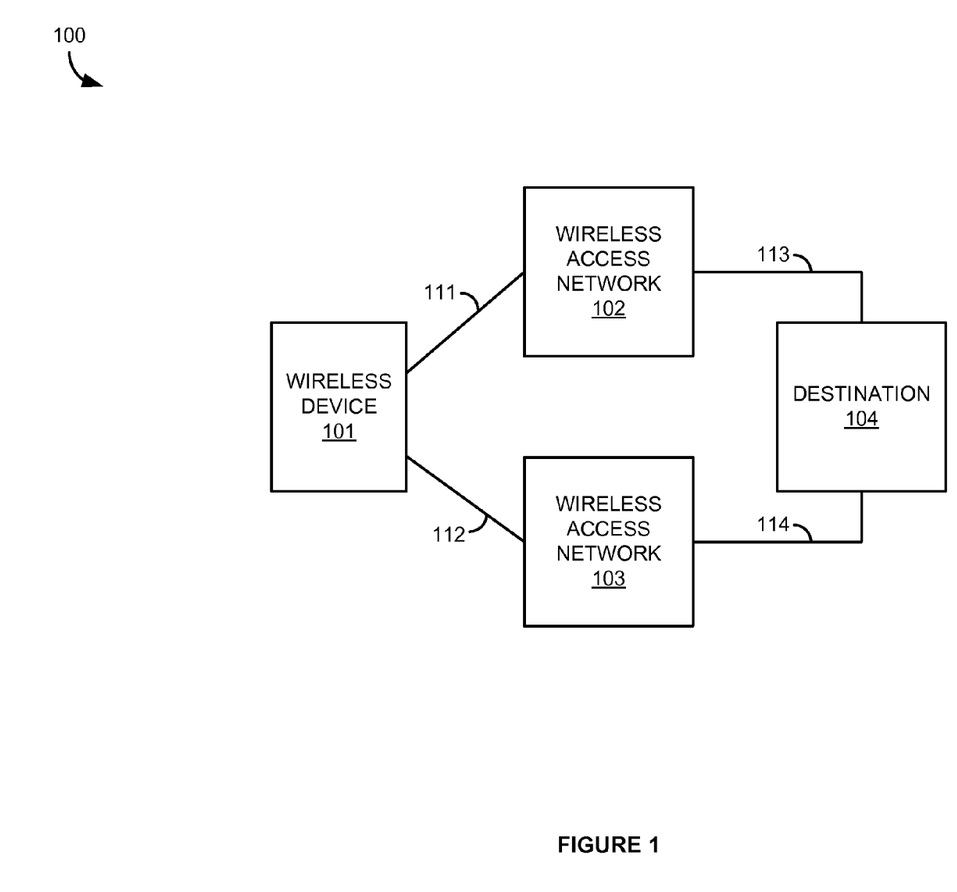
FIG. 1 illustrates a wireless communication system for dividing packet content for transmission over diverse wireless links.

FIG. 1 illustrates wireless communication system 100 for dividing packet content for transmission over diverse wireless links. Wireless communication system 100 includes wireless communication device 101, wireless access networks 102-103, and destination 104. Wireless communication device 101 and wireless access network 102 communicate over wireless link 111. Wireless communication device 101 and wireless access network 103 communicate over wireless link 112. Wireless access network 102 and destination 104 communicate over communication link 113. Wireless access network 103 and destination 104 communicate over communication link 114.

In operation, wireless device 101 exchanges packet communications with destination 104. These packet communications may be for a variety of services that may be provided to wireless device 101, including services for applications running on wireless device 101. For example, packets may include data relating to user data for an application, such as a real time video or voice communications, web browsing, audio/video streaming, file downloading, or any other type of data packet communications.

Typically, when exchanging communications with a destination, a wireless device will choose the fastest communication link available to the wireless device. Thus, if wireless link 111 to wireless network 102 is a faster link than wireless link 112 to wireless network 103, then wireless device 101 will most likely choose to exchange packets with destination 104 through wireless network 102 and wireless link 111.

Regardless with which wireless network of wireless networks 102-103 that wireless device 101 chooses to exchange packets, that wireless network may use Deep Packet Inspection (DPI) equipment. DPI equipment allows a communication network to monitor the payload content of the packets that pass through the network. For example, a communication network may be able to recognize a computer virus using DPI and then take appropriate action to stop the spread of the virus. However, in addition to this and other beneficial uses, DPI equipment may be used to recognize information that a user of a wireless device may not want to reveal. Such information may include identities of websites that the user visits or private user information, such as usernames and passwords. Even if wireless networks 102-103 do not use DPI equipment for detecting this type of information, there may be further networks and systems between wireless networks 102-103 and destination 104 that do.

Figure 2:
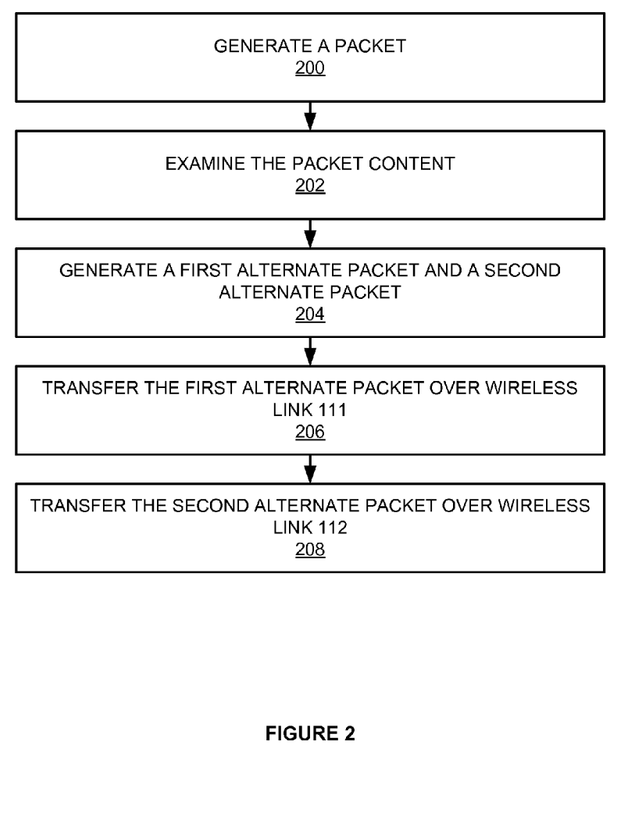
FIG. 2 illustrates the operation of the wireless communication system to divide packet content for transmission over diverse wireless links.

FIG. 2 illustrates the operation of wireless communication system 100 to divide packet content for transmission over diverse wireless links. The operation begins with wireless device 101 generating a packet for transmission to destination 104 (step 200). The packet could be a data packet for an Internet Protocol (IP) communication, such as web browsing, application data, audio/video streaming, Voice over IP (VoIP), email, or any other type of packet communications. An application executing on wireless device 101 or some other software running on wireless device 101, such as an operating system or firmware, may generate the packet. For example, the packet may be generated by a web browser, email client, social networking application, VoIP client, media player, or any other type of application that wireless device 101 may execute that would generate a packet for transmission to a destination. Destination 104 may be a user communication device, web server, VoIP system, email server, media server, or any other type of system or device that may receive packets from wireless device 101.

Wireless device 101 examines the packet to determine whether content within the packet qualifies for transmission over diverse wireless links comprising wireless link 111 and wireless link 112 (step 202). The content may be any type of data that may be transferred from wireless device 101 to destination 104 including, but not limited to, all or part of a website request, all or part of user indentifying information, all or part of an email message, outgoing VoIP data, or some other type of data that can be transferred via packets. The content may qualify for transmission over diverse wireless links for a variety of reasons. For example, the content may include a web address, username, password, or some other type of information that a user would like to keep anonymous until that information reaches destination 104.

Criteria may be applied to the content in order to make the determination of whether the content qualifies for transmission over diverse links. The criteria may be predefined in wireless device 101 or may be defined later by user input, received via wireless links 111 or 112, or any other way that a wireless device may obtain criteria information. For example, a user may indicate in a security setting for wireless device 101 that all website requests, usernames, and passwords be sent over diverse wireless links. In an alternative example, there may exist a list or other indicator of specific websites, usernames, or passwords that should be sent over diverse wireless links.

If wireless device 101 determines that the content qualifies for transmission over the diverse wireless links, then wireless device 101 generates a first alternate packet that contains a first portion of the content and a second alternate packet that contains a second portion of the content (step 204). The two alternate packets may be new packets with the contents of the original packet split among them. In other words, wireless device 101 may create two alternate packets from the one original packet in such a way as to present the content of the original packet as though the content had been split into two packets from the beginning. For example, the alternate packets may include a shim header that indicates that the first and second alternate packets should be reassembled. Alternatively, the two alternate packets may be created as part of a packet division functionality provided for in a communication protocol. For example, the IPv4 protocol has a function that allows for the fragmentation of single data packets into multiple data packets for transmission over links with limited packet size, wherein the original packet is then reassembled at the destination. Alternative packet transmission protocols may also be used, such as IPv6, other IP versions, or other packet exchange protocols.

The content of the packet may be separated into the first portion and the second portion by analyzing the content to ensure that the content is sufficiently split for the purposes of non-recognition. Alternatively, the content of the packet may be separated into the first portion and the second portion at a predefined location, such as in the middle of the bits that comprise the payload portion of the packet.

In some embodiments, additional wireless links and networks may be available to wireless device 101. In those embodiments, additional alternate packets may be created in order to further divide the content.

After creating the first alternate packet, wireless device 101 transfers the first alternate packet over wireless link 111 for delivery to destination 104 (step 206). Likewise, after creating the second alternate packet, wireless device 101 transfers the second alternate packet over wireless link 112 for delivery to the destination (step 208).

Advantageously, if there exists any DPI equipment in wireless networks 102-103 or on any intervening system or network between wireless networks 102-103 and destination 104, then that DPI equipment will only be able to detect either the first portion or second portion of the content and will not be able to detect the portion sent over the other link. Therefore, content sent over diverse links allows the entirety of the content to be concealed from DPI equipment.

In some embodiments, if the content of the packet does not qualify for transmission over diverse wireless links, then the packet is transferred over the wireless link that wireless device 101 is using to exchange the majority of packets with destination 104. For example, if wireless device 101 is using wireless link 111 for all packet communications that do not require diverse links, then the packet will be sent over wireless link 111. Wireless device 101 may be using wireless link 111 over wireless link 112 because wireless link 111 may be faster, less costly, or provide some other benefit for transferring packets. If that is the case, then the low volume of packets that will be transferred over wireless link 112 due to content that qualifies for transmission over diverse wireless links will negligibly affect the benefits of using wireless link 111 for the bulk of packet exchanges.

For example, wireless device 101 may determine that a website request should be transferred over diverse links. Therefore, the packet containing the website URL is split and a portion of the URL is transferred over wireless link 111 and the other portion is transferred over wireless link 112. Even if wireless link 112 is considerably slower than wireless link 111, transferring a single packet over wireless link 112 should not adversely affect the user experience for the website since the bulk of the data for the website will be exchanged over the faster wireless link 111. Likewise, if the site further requires a username and password then the packet or packets containing the username and password may also be sent over diverse links while other data for the website continues to be transferred over wireless link 111.

In some embodiments, when the packet content that qualifies for transmission on diverse links is split, the portions of the content must arrive in destination 104 at or near the same time. This may be the case if the content is part of a real time communication protocol, such as communications that use the User Datagram Protocol (UDP). In those situations, if the communication path through wireless link 111 is faster than that through wireless link 112, then transference of the first alternate packet should be delayed based on the transfer speed differential between wireless link 111 and wireless link 112.

In some embodiments, packet content transferred from destination 104 may qualify for transmission over diverse wireless link. In those embodiments, destination 104 creates a first and second alternate packet containing a first and second portion of the content, respectively. The first alternate packet is transferred to wireless device 101 via wireless link 111 and the second alternate packet is transferred to wireless device 101 via wireless link 112. Destination 104 may transfer the first alternate packet to a network address for wireless device 101 that is associated with wireless link 111 and transfer the second alternate packet to a network address for wireless device 101 that is associated with wireless link 112. The content of the original packet content is then reassembled at wireless device 101 from the first and second portions of the content, possibly based on shim headers within the alternate packets.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access networks 102-103 comprise network elements that provide wireless devices with wireless communication access to packet communication services. Wireless networks 102-103 may comprise switches, wireless access nodes, Internet routers, network gateways, application servers, computer systems, communication links, or some other type of communication equipment—including combinations thereof.

Destination 104 comprises a computer system and communication interface. Destination 104 may also include other components such a router, server, data storage system, and power supply. Destination 104 may reside in a single device or may be distributed across multiple devices. Destination 104 is shown externally to wireless communication networks 102-103, but destination 104 could be integrated within the components of wireless communication networks 102-103 or some other communication network, such as the Internet.

Wireless links 111-112 uses the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 113-114 uses metal, glass, air, space, or some other material as the transport media. Communication links 113-114 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 113-114 could be direct links or may include intermediate networks, systems, or devices.

Figure 3:
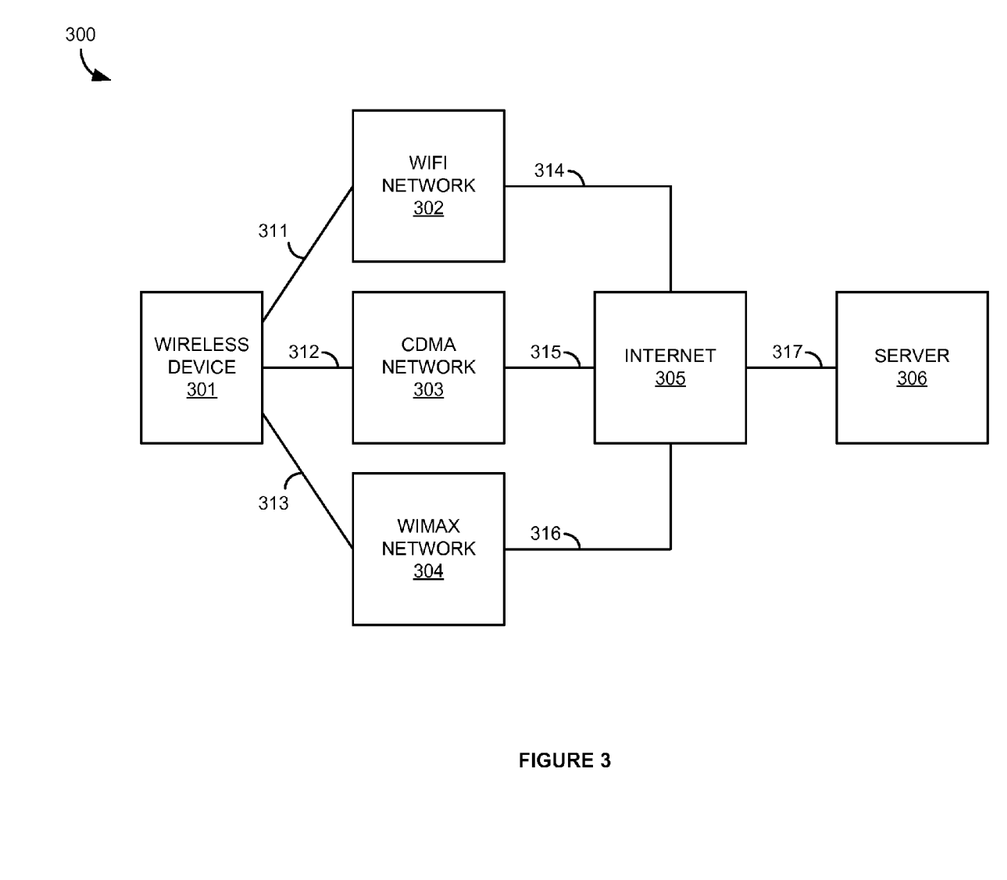
FIG. 3 illustrates a wireless communication system for dividing packet content for transmission over diverse wireless links.

FIG. 3 illustrates wireless communication system 300 for dividing packet content for transmission over diverse wireless links. Wireless communication system 300 includes wireless communication device 301, WIFI network 302, CDMA network 303, WIMAX network 304, Internet 305, and server 306. Wireless communication device 301 and WIFI network 302 communicate over wireless link 311. Wireless communication device 101 and CDMA network 303 communicate over wireless link 312. Wireless communication device 101 and WIMAX network 304 communicate over wireless link 313. WIFI network 302 and Internet 305 communicate over communication link 314. CDMA network 303 and Internet 305 communicate over communication link 315. WIMAX network 304 and Internet 305 communicate over communication link 316. Internet 305 and server 306 communicate over communication link 317.

The wireless access networks shown in FIG. 3 are exemplary. Alternatively wireless networks 302-304 may use type of wireless protocol that is capable of exchanging data packets, such as the Global System for Mobile (GSM) or Long Term Evolution (LTE).

Figure 4:
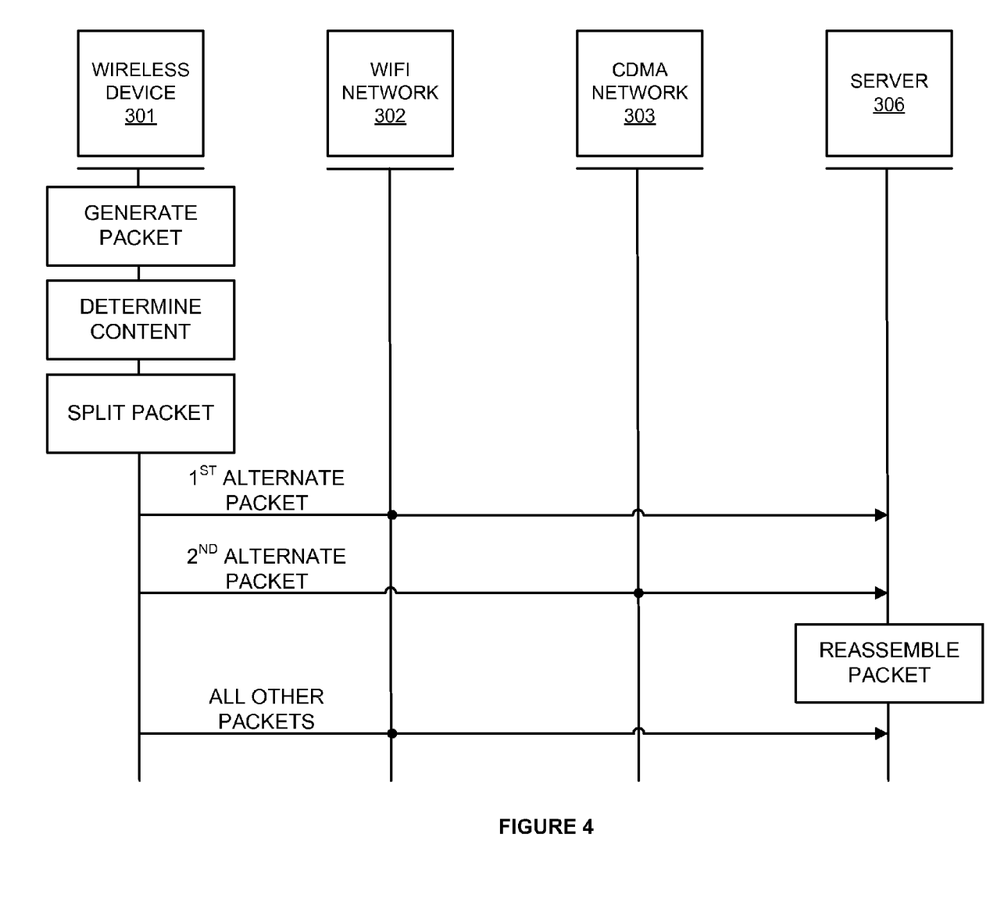
FIG. 4 illustrates the operation of the wireless communication system to divide packet content for transmission over diverse wireless links.

FIG. 4 is a sequence diagram illustrating the operation of wireless communication system 300 to divide packet content for transmission over diverse wireless links. In this example, WIFI network 302 and CDMA network 303 are capable of exchanging packets with wireless device 301. In particular, WIFI network 302 is a faster communication path so wireless device 301 exchanges packets using WIFI network 302 rather than CDMA network 303. WIMAX network 304 is not capable of communicating with wireless device 301 because WIMAX network 304 may be out of wireless signal range, may be malfunctioning, or some other reason that a wireless network may be incapable of communicating with a wireless device.

The operation begins when a user of wireless device 301 desires to retrieve a website using a web browser application. The user indicates to the browser the desired URL for the website. In this example, the URL www.examplesite.com is indicated to the web browser application.

After receiving the URL, the browser creates a Hypertext Transfer Protocol (HTTP) GET request for transference to server 306 to retrieve the website. Server 306 is a web server, domain name server, or some other type of system used when wireless device 101 attempts to retrieve a web page. The get request is formed into an IP packet for transmission to server 306. The packet may be generated in the web browser application, system software of wireless device 301, a communication interface of wireless device 301, or some other area of wireless device 301.

Before transferring the packet, wireless device 301 inspects the contents of the packet to determine whether the content of the packet should be transferred over diverse wireless links. In this example, a setting within wireless device 301 indicates that all HTTP GET requests should be transferred over diverse wireless links. Therefore, when wireless device 301 determines that the packet contains a GET request, wireless device 301 fragments the packet into a first alternate packet and a second alternate packet. The first alternate packet contains a first portion of the GET request and the second alternate packet contains a second portion of the GET request. The original packet is fragmented into the first and second alternate packets using the fragmentation functionality in IPv4.

Figure 6:
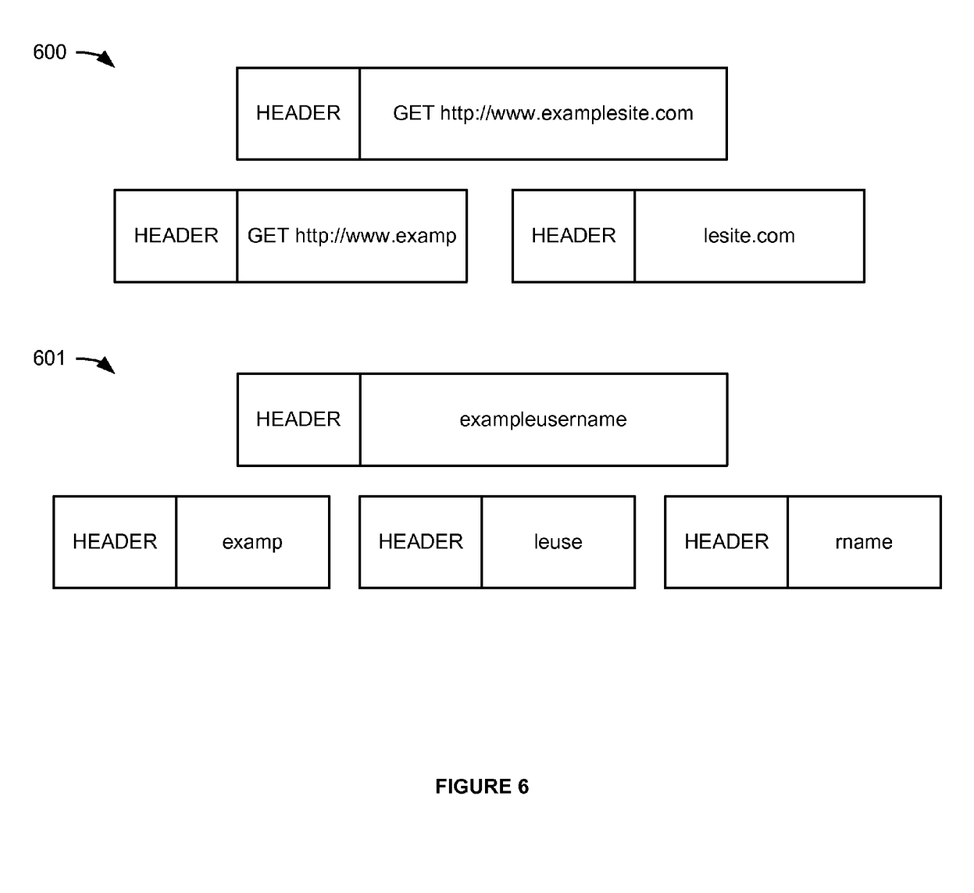
FIG. 6 illustrates packet sets generated when dividing packet content for transmission over diverse wireless links.

FIG. 6 illustrates packet set 600. Packet set 600 includes an abstraction of the original GET request packet along with two alternate packets that are formed after fragmentation. In this example, wireless device 301 determines that the content of the packet should be split into 'GET http://www.examp' and 'lesite.com' for diverse transmission. Hence, the payload of each alternate packet contains a portion of the original packet payload. It does not matter which alternate packet contains which portion of the get request because the fragmentation functionality of IPv4 provides that the alternate packets will be reassembled at server 306 in the same manner regardless of the path used to get to server 306.

Referring back to FIG. 4, after fragmentation, wireless device 301 transfers the first alternate packet over wireless link 311 to WIFI network 302. Additionally, wireless device 301 transfers the second alternate packet over wireless link 312 to CDMA network 303. Any DPI equipment on either WIFI network 302 or CDMA network 303 is thereby unable to determine the full contents of the GET request.

The first and second alternate packets are routed from WIFI network 302 and CDMA network 303 through Internet 305 to server 306. Once received by server 306, server 306 is able to recognize that IP fragmentation has been used on the first and second alternate packets. Accordingly, server 306 reassembles the content of the alternate packets to retrieve the GET message and then services the GET message as requested by the web browser application.

All other packets transferred to server 306 that do not qualify for transmission over diverse wireless links remain intact and are transferred to server 306 over WIFI network 302. Therefore, while CDMA network 303 may be slower for packet transmission purposes, the single second alternate packet that is sent using CDMA network 303 is negligible in comparison to the amount of other packets that are sent using the faster WIFI network 302.

Figure 5:
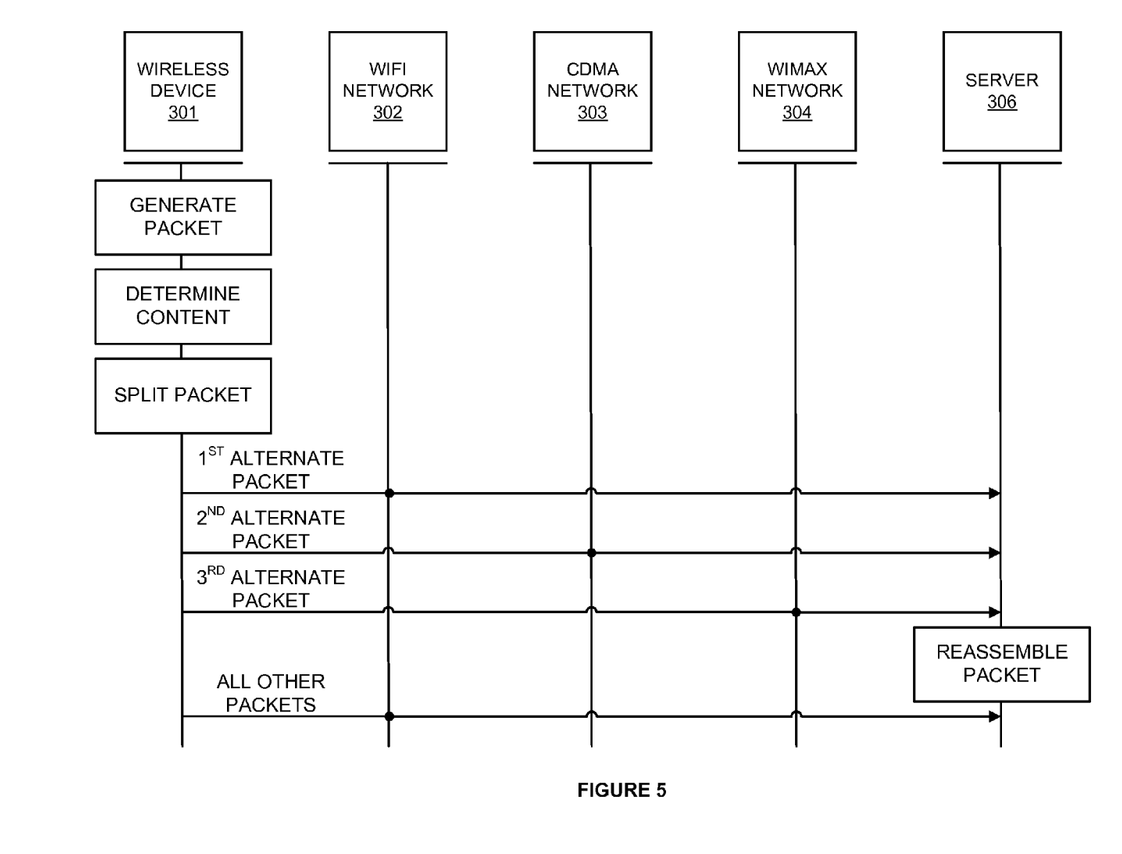
FIG. 5 illustrates the operation of the wireless communication system to divide packet content for transmission over diverse wireless links.

FIG. 5 is a sequence diagram illustrating the operation of wireless communication system 300 to divide packet content for transmission over diverse wireless links. In this example, WIFI network 302, CDMA network 303, and WIMAX 304 network are capable of exchanging packets with wireless device 301. In particular, WIFI network 302 is a faster communication path so wireless device 301 exchanges packets using WIFI network 302 rather than CDMA network 303 or WIMAX network 304.

The operation begins when a user of wireless device 301 desires to access information through an application that requires a username and password. The user indicates a username for the user to the application. In this example, the username 'exampleusername' indicated to the application.

After receiving the username, the application performs actions necessary to transfer the username to server 306. Server 306 is a web server, application server, or some other type of system accessed by the application to retrieve application information. The username is formed into an IP packet for transmission to server 306. The packet may be generated in the application, system software of wireless device 301, a communication interface of wireless device 301, or some other area of wireless device 301.

Before transferring the packet, wireless device 301 inspects the contents of the packet to determine whether the content of the packet should be transferred over diverse wireless links. In this example, a setting within wireless device 301 indicates that packets containing 'exampleusername' should be transferred over diverse wireless links. Therefore, when wireless device 301 determines that the packet contains 'exampleusername', wireless device 301 fragments the packet into a first alternate packet, a second alternate packet, and a third alternate packet. The first alternate packet contains a first portion of the username, the second alternate packet contains a second portion of the username, and the third alternate packet contains a third portion of the username. The original packet is fragmented into the first and second alternate packets using the fragmentation functionality in IPv4.

FIG. 6 illustrates packet set 601. Packet set 601 includes an abstraction of the original username packet along with three alternate packets that are formed after fragmentation.

In this example, wireless device 301 determines that the content of the packet should be split into 'examp', 'leuse', and 'rname' for diverse transmission. Hence, the payload of each alternate packet contains a portion of the original packet payload. It does not matter which alternate packet contains which portion of the get request because they will be reassembled at server 306 in the same manner regardless of the path used to get to server 306.

Referring back to FIG. 5, after fragmentation, wireless device 301 transfers the first alternate packet over wireless link 311 to WIFI network 302. Additionally, wireless device 301 transfers the second alternate packet over wireless link 312 to CDMA network 303 and the third alternate packet over wireless link 313 to WIMAX network 304. The first, second, and third alternate packets are routed from WIFI network 302, CDMA network 303, and WIMAX network 304 through Internet 305 to server 306. Once received by server 306, server 306 is able to recognize that IP fragmentation has been used on the first, second, and third alternate packets. Accordingly, server 306 reassembles content of the alternate packets to retrieve the username and then performs appropriate action based on the received username. The same fragmentation process may be repeated for a password associated with the username.

All other packets transferred to server 306 that do not qualify for transmission over diverse wireless links remain intact and are transferred to server 306 over WIFI network 302. Therefore, while CDMA network 303 and WIMAX network 304 may be slower for packet transmission purposes, the second and third alternate packets that are sent using CDMA network 303 and WIMAX network 304 is negligible in comparison to the amount of other packets that are sent using the faster WIFI network 302.

Figure 7:
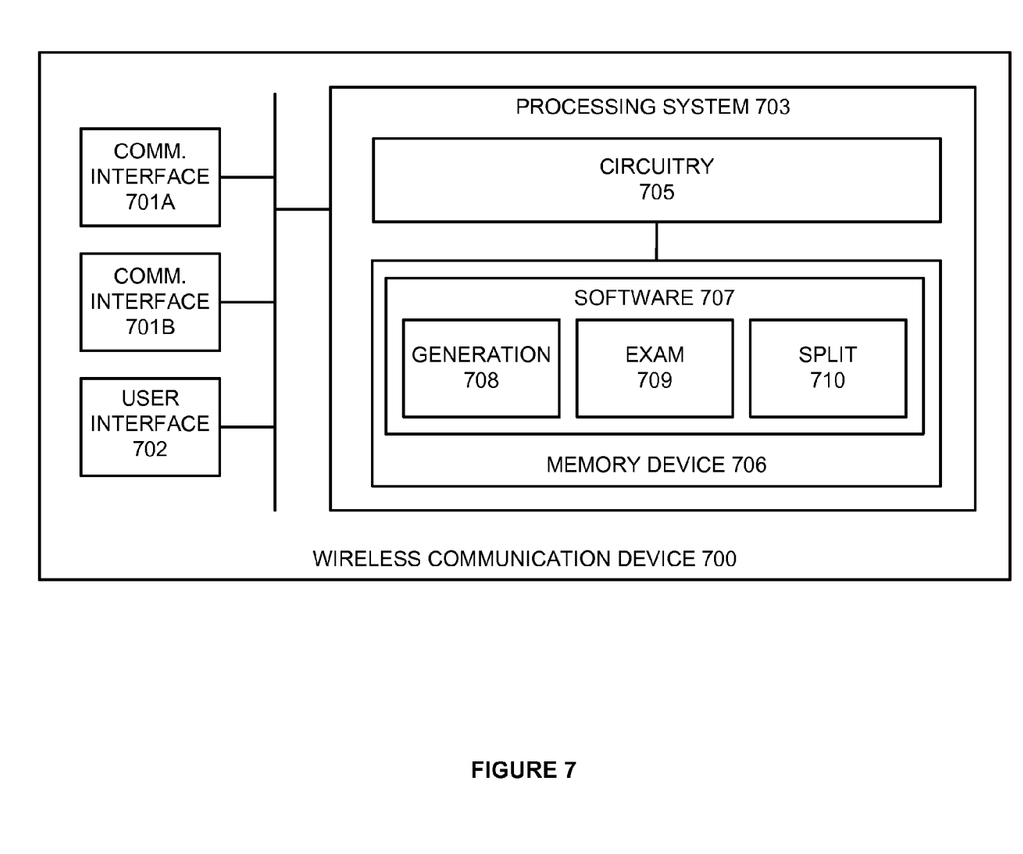
FIG. 7 illustrates a wireless communication device for dividing packet content for transmission over diverse wireless links.

FIG. 7 illustrates wireless communication device 700 for dividing packet content for transmission over diverse wireless links. Wireless communication device 700 is an example of wireless communication devices 101 and 301, although devices 101 and 301 could use alternative configurations. Wireless communication device 700 comprises wireless communication interfaces 701A and 701B, user interface 702, and processing system 703. Processing system 703 is linked to wireless communication interfaces 701, 701B, and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interfaces 701A and 701B comprise RF communication circuitry and an antenna. The RF communication circuitry typically includes an amplifier, filter, RF modulator, and signal processing circuitry. Wireless communication interfaces 701A and 701B may also include a memory device, software, processing circuitry, or some other communication device. Wireless communication interfaces 701A and 701B may use various protocols, such as CDMA, EVDO, WIMAX, GSM, LTE, WIFI, HSPA, or some other wireless communication format.

Wireless communication interface 701A is configured to transfer a first alternate packet over a first wireless link for delivery to a destination. Wireless communication interface 701B is configured to transfer a second alternate packet over a second wireless link for delivery to the destination.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes packet generation module 708, packet examination module 709, and packet splitting module 710. Operating software 707 may further include an operating system, utilities, drivers, network interfaces, applications, or some other type of software. When executed by processing circuitry 705, operating software 707 directs processing system 703 to operate wireless communication device 700 as described herein.

In particular, packet generation module directs processing system 703 to generate a packet for transmission to a destination. Packet examination module 709 directs processing system 703 to examine the packet to determine if content within the packet qualifies for transmission over diverse wireless links comprising the first wireless link and the second wireless link. If the content qualifies for transmission over the diverse wireless links, packet splitting module 710 directs processing system 703 to generate the first alternate packet that contains a first portion of the content and the second alternate packet that contains a second portion of the content.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication device, the method comprising:
   comparing content within a packet to predetermined qualification criteria to determine if the packet qualifies for transmission to a destination over diverse wireless links including a first wireless link and a second wireless link, wherein the packet qualifies for transmission over the diverse wireless links when the content matches the predetermined qualification criteria;
   when the content within the packet qualifies for transmission over the diverse wireless links,
      analyzing the content within the packet to determine where to split the packet so that the content of the packet cannot be determined without combining the first portion of the content and the second portion of the content,
      generating a first alternate packet that contains a first portion of the content and a second alternate packet that contains a second portion of the content based on the determination as to where to split the packet,
      transferring the first alternate packet over the first wireless link for delivery to the destination, and
      transferring the second alternate packet over the second wireless link for delivery to the destination.

2. The method of claim 1 further comprising:
   generating the packet for transmission to the destination; and
   examining the packet to identify the content within the packet.

3. The method of claim 1 further comprising:
   delaying the transference of the first alternate packet based on a packet transfer speed differential between the first wireless link and the second wireless link.

4. The method of claim 1 further comprising:
   when the content does not qualify for transmission over the diverse wireless links, transferring the packet over the first wireless link.

5. The method of claim 1 wherein the content is reassembled at the destination from the first and second portions of the content.

6. The method of claim 1 wherein the content is a Hypertext Transfer Protocol (HTTP) GET request.

7. The method of claim 1 wherein the content is a username for access to the server.

8. The method of claim 1 wherein the content is a password for access to the server.

9. The method of claim 1 wherein the first wireless link is a Wireless Fidelity (WiFi) link and the second wireless link is a Code Division Multiple Access (CDMA) link.

10. The method of claim 1 wherein the first wireless link is a Worldwide Interoperability for Microwave Access (WiMAX) link and the second wireless link is a Code Division Multiple Access (CDMA) link.

11. A communication device comprising:
   a processing system configured to generate a packet for transmission to a destination, examine the packet to determine whether content within the packet qualifies for transmission over diverse wireless links including a first wireless link and a second wireless link, and, if the content qualifies for transmission over the diverse wireless links, analyze the content within the packet to determine where to split the packet so that the content of the packet cannot be determined without combining the first portion of the content and the second portion of the content, generate a first alternate packet that contains a first portion of the content and a second alternate packet that contains a second portion of the content based on the determination as to where to split the packet, wherein to determine whether the content within the packet qualifies for transmission over the diverse wireless links, the communication device compares the content to predetermined qualification criteria;
   a first communication interface configured to transfer the first alternate packet over the first wireless link for delivery to the destination; and
   a second communication interface configured to transfer the second alternate packet over the second wireless link for delivery to the destination.

12. The communication device of claim 11 further comprising:
   the first communication interface further configured to delay the transference of the first alternate packet based on a packet transfer speed differential between the first wireless link and the second wireless link.

13. The communication device of claim 11 further comprising:
  the first communication interface further configured to, if the content does not qualify for transmission over the diverse wireless links, transfer the packet over the first wireless link.

14. The communication device of claim 11 wherein the content is reassembled at the destination from the first and second portions of the content.

15. The communication device of claim 11 wherein the content is a Hypertext Transfer Protocol (HTTP) GET request.

16. The communication device of claim 11 wherein the content is a username for access to the server.

17. The communication device of claim 11 wherein the content is a password for access to the server.

18. The communication device of claim 11 wherein the first wireless link is a Wireless Fidelity (WiFi) link and the second wireless link is a Code Division Multiple Access (CDMA) link.

19. A method of operating a communication system comprising:
  receiving a first alternate packet from a first network address associated with a first wireless link from a communication device;
  receiving a second alternate packet from a second network address associated with a second wireless link from the communication device;
  generating a packet for transmission to the communication device;
  examining the packet to identify content within the packet;
  comparing the content to predetermined qualification criteria to determine if the packet qualifies for transmission over diverse wireless links comprising the first wireless link and the second wireless link, wherein the packet qualifies for transmission over the diverse wireless links when the content matches the predetermined qualification criteria; and
  when the second content qualifies for transmission over the diverse wireless links, analyzing the content within the packet to determine where to split the packet so that the content of the packet cannot be determined without combining the first portion of the content and the second portion of the content, generating a third alternate packet that contains a first portion of the content and a fourth alternate packet that contains a second portion of the content based on the determination as to where to split the packet, transferring the third alternate packet to the first network address, and transferring the fourth alternate packet to the second network address.

* * * * *